US007123296B2

(12) United States Patent
Misawa

(10) Patent No.: US 7,123,296 B2
(45) Date of Patent: Oct. 17, 2006

(54) DIGITAL CAMERA DEVICE FOR FACILITATING A RECOVERY AND RECYCLING SYSTEM

(75) Inventor: Takeshi Misawa, Saitama (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 636 days.

(21) Appl. No.: 10/153,701

(22) Filed: May 24, 2002

(65) Prior Publication Data
US 2002/0180873 A1 Dec. 5, 2002

(30) Foreign Application Priority Data
May 30, 2001 (JP) ............... P2001-162545

(51) Int. Cl.
*H04N 5/76* (2006.01)
(52) U.S. Cl. .................. 348/231.9; 348/231.6
(58) Field of Classification Search ........... 348/231.3, 348/231.99, 231.6–9, 552; 396/321
See application file for complete search history.

(56) References Cited

U.S. PATENT DOCUMENTS

| | | | | |
|---|---|---|---|---|
| 5,291,554 A | * | 3/1994 | Morales | 380/211 |
| 5,477,264 A | * | 12/1995 | Sarbadhikari et al. | 348/231.6 |
| 5,870,643 A | * | 2/1999 | Szajewski et al. | 396/429 |
| 6,393,225 B1 | * | 5/2002 | Yamada | 396/535 |
| 6,563,542 B1 | * | 5/2003 | Hatakenaka et al. | 348/333.02 |
| 2001/0040625 A1 | * | 11/2001 | Okada et al. | 348/207 |
| 2002/0035687 A1 | * | 3/2002 | Skantze | 713/168 |
| 2002/0071043 A1 | * | 6/2002 | Suzuki | 348/231 |
| 2002/0191088 A1 | * | 12/2002 | Misawa | 348/231.7 |

FOREIGN PATENT DOCUMENTS

| | | | |
|---|---|---|---|
| JP | 2000-147623 | * | 5/2000 |
| JP | 2000-228740 | | 8/2000 |
| JP | 2000-299847 | * | 10/2000 |

OTHER PUBLICATIONS

Translation of JP2000-147,623.*

* cited by examiner

*Primary Examiner*—Ngoc-Yen Vu
*Assistant Examiner*—Hung H. Lam
(74) *Attorney, Agent, or Firm*—Sughrue Mion, PLLC

(57) ABSTRACT

In a digital camera in which a photographic field is photographed and which has an image pick-up device 102 for outputting an image signal corresponding to a photographic field, an analog signal processing circuit 106 for processing the image signal, a digital signal processing circuit 108 and an image data processing section 110, a detachable memory card 112 for storing so that the image information processed by the processing means can be read out, and a CPU 111 for controlling an operation of each section, the digital camera has a program by which the ID information previously stored in the memory card 112 is read out, and stored in a digital camera main body side.

25 Claims, 7 Drawing Sheets

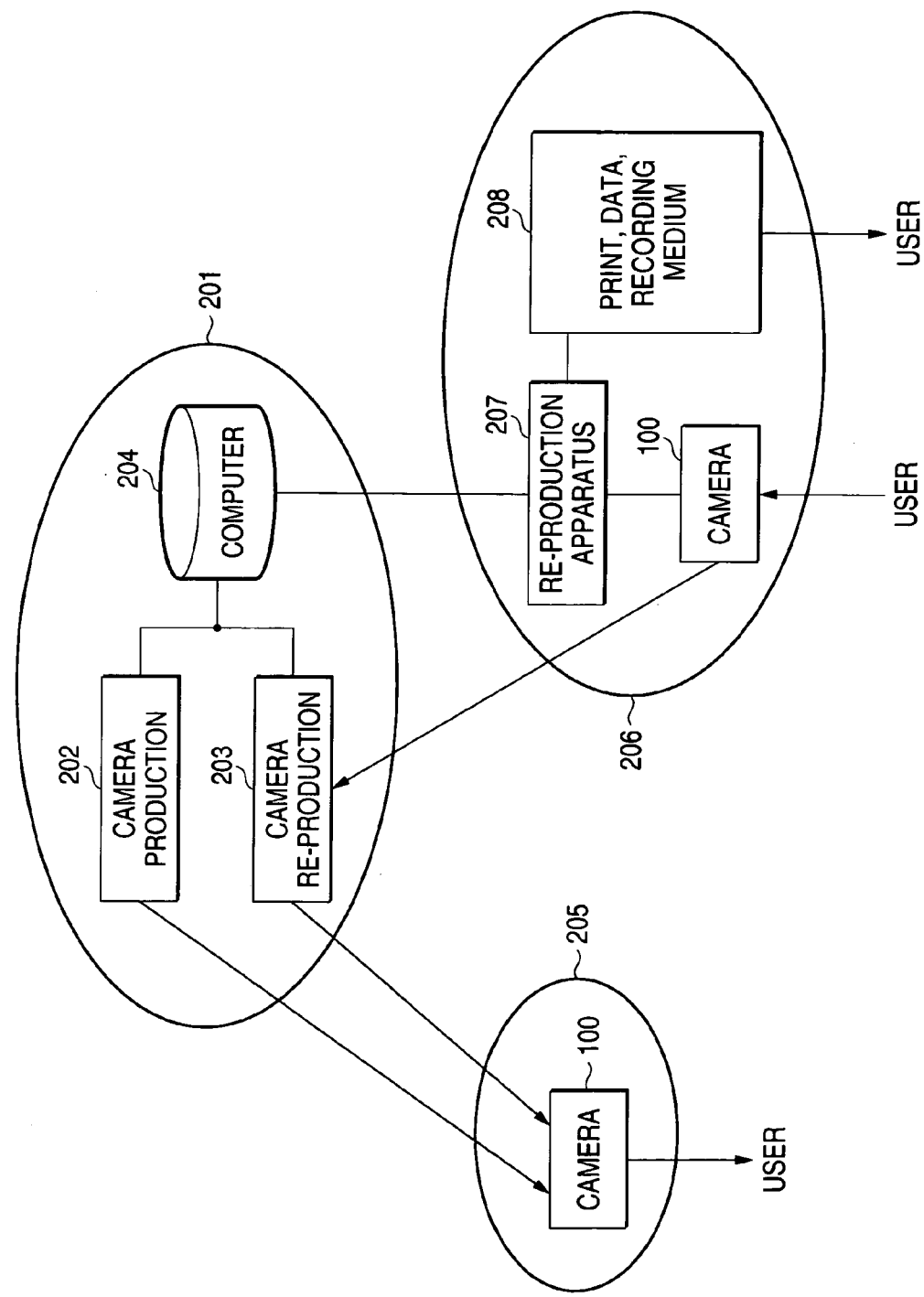

DIGITAL CAMERA DEVICE FOR FACILITATING A RECOVERY AND RECYCLING SYSTEM

BACKGROUND OF THE INVENTION

1. Field of the Invention

The present invention relates to a digital camera in which the image information from an image pick-up means is stored in a recording medium, and particularly, to a digital camera appropriate for structuring a recycling system.

2. Description of the Related Art

Presently, a product providing system in which, by a mode of a rental use or sale, the camera is provided to the user, and it is recovered, recycled, and the photographed and developed film or a print obtained from the film is provided to the user, is spread. As a camera, for example, a lens-fitted film unit is widely used.

On the one hand, accompanied by a spread of a digital camera in which the image signal obtained from the image pick-up element to photograph a photographic field is processed, and the photographed image is converted into the digital type data and recorded, also relating to the digital camera, the same recovery and recycling system is proposed.

In the system in which the digital camera is provided to the user and the photographed camera is recovered and recycled, because the photographed image is stored in the camera as the digital data, its reading-out or erasing is easy, and there is an advantage that it is appropriate for the recycle in which the camera is repeatedly used. However, on the contrary to that, when the data is easily read out or erased by the user or the third party (another traders), the camera main body for the recycle use is not recovered, and the recycle itself can not be realized.

For example, when the third party who does not produce the camera by itself, and borrows the marketed recycled camera without notice and conducts unfairly the same service, appears, the recovery rate of the camera is lowered, and the normal recovery and the maintenance of recycling system are threatened, and the presentation of the photographic image service with a low cost and stable quality becomes difficult. Further, in the above unfair third party service, it is also anxious about that the high quality print service is not guaranteed. Further, in the case where the recycled camera is missed or stolen, when the stored image data is easily read or the camera can be freely repeatedly used after that, the reliability of the recovery and recycle system itself is lowered, and finally, the photographic image service with the low cost and stable quality can not be presented. Accordingly, in the recycle system, the increase of the recovery rate of the camera becomes a key for the supply of the low cost and stable service.

Accordingly, a digital camera and its production and recycling system in which it is made a high security structure in which the recorded data of the camera can not easily be read and erased, and the recovery rate of the camera is increased, and which is for providing the photographic image service in which the quality is stable, to the user, are proposed (for example, JPA-A-2000-228740).

When an outline of the recycle system is described, it is as follows. In the production system (manufacturer) who conducts the production of the camera, a password collation circuit is provided, and a digital camera in which the individually given password is stored in the memory of the camera main body is produced, and supplied to the user. The correspondence relationship data of the ID number proper to camera main body and the given password is stored in the manufacturer. The camera in which the user completed the photographing is recovered, and sent to the recycle system in which the service such as a print is conducted. In the recycle system, from the ID number written on the camera external packing, the password kept in the manufacturer is read out, and collated with the password stored in the camera main body. When the password is coincident, the read out of the photographed image data is permitted, and the service such as the print or data presentation is conducted. After that, the camera main body is sent to a production system again, and in the reproduction installation, after the inspection of the main body, and replacement of parts are conducted, a clear of the photographic information and the renewal of the password or ID information are conducted, and the reproduced camera is supplied to the user. This cycle is repeated and the recycle system is structured. The camera used in this system is structured in such a manner that the memory means to store the data can not be removed from the main body such as the built-in memory so that the photographic data can not easily be read out and erased.

As a matter of course, in the above structure, the re-production (recycle process) of the camera can not be conducted only after a process (data read-out and print process) in which, from the recovered photographed digital camera, the photographic image data is read out and print is conducted. Therefore, when it takes a long period of time in the password collation process to read out the data, or data read-out process, or the trouble is generated, the subsequent recycle process is delayed.

In the so-called lab in which the service by which the photographic data is read from the recovered camera, data processing is conducted, and the photographic image is printed on the printing paper and presented to the user, or the photographic image data itself is recorded in another recording medium and presented, is conducted, because the number of cameras to be processed becomes large, when the data read-out processing is delayed, the large number of cameras are accumulated for the waiting of processing. In such a case, the security of the position to store the cameras, or elongation of the processing line is necessary, and the cost of the whole recycle system is increased.

Even when the data read-out is delayed, when the camera is structured in such a manner that only the recycle of the camera main body can be separately conducted, the camera main body with a large volume is smoothly processed, and a surplus storage space or long process line is not necessary, and the increase of the cost can be prevented.

Accordingly, it is desirable in the efficiency that the data read-out and the print process, and recycle process can be carried out separately and independently. However, in the conventional structure, because the memory means in which the data is stored, can not be removed from the camera main body, it is impossible.

SUMMARY OF THE INVENTION

In order to solve such defects of the conventional technology, the object of the present invention is to provide a digital camera for the recycle in which the memory means in which the image data is stored, is made detachable, and the unfair taking off of the memory means, unfair reading-out of image data, and erasing can not be conducted, and the security is high, and to make the camera SO that the data reading-out and print process, and the recycle process are separated, and respective processes can be independently and effectively conducted.

In order to solve the above problems, a digital camera in which a photographic field is photographed and which has an image pick-up means (image pick-up device 102) for outputting an image signal corresponding to a photographic field, processing means for processing the image signal (analog signal processing circuit 106, digital signal processing circuit 108, image data processing section 110), detachable memory means (memory card 112) for storing so that the image information processed by the processing means can be read out, and control means (CPU 111) for controlling an operation of each section, the digital camera of the present invention is characterized in that: it has a program by which the identifying information previously stored in the memory means is read out, and stored in a digital camera main body side.

According to this structure, at the time of the production of the camera, when the program is conducted by a special switch operation, which is not opened, because the ID information of the memory means is stored in the main body side, the camera main body and the memory means can be controlled in 1 to 1. That is, because the memory means and the camera main body respectively have the ID information, the normal memory means is removed, and a mode of use in which another memory means is installed into this digital camera and operated, can be detected by the nonconformity of the ID information. Thereby, the unfair disassembling or exchange of the memory means, reading-out or erasing by the user or the third party can be prevented. Further, also at the time of the re-production of the camera, when the program is conducted, because the ID information of the installed memory means is stored in the camera main body side by the overwriting, in the same manner, the recycled camera main body and the memory means can be controlled in 1 to 1. In this case, it is not necessary that it is the camera in which the memory means and camera main body correspond to each other in 1 to 1 at the time of production. Accordingly, after the photographed camera is recovered and the memory means is removed from the camera main body, the corresponding relationship of the ID information becomes unnecessary. Therefore, the reading-out of the data from the memory means and the print process, and the recycle process of the camera main body can be separated, and both processes can be parallelly and effectively conducted.

Further, to solve the above problems, the present invention is characterized in that the program is stored in the memory means.

According to this structure, because the program to store the ID information is stored in the memory means side, even when the normal memory means is removed off and another memory means is installed into this digital camera and the camera is tried to be operated, the registration of the ID information can not be conducted. The unfair removing off or exchange of the memory means, and reading-out or erasing of the image data by the user or the third party are prevented.

Further, in order to the above problems, the present invention is characterized in that: in the program stored in the memory means, after the ID information is stored in the digital camera main body side, the program itself is erased.

According to this structure, even when the not-opened special switch operation for carrying out the program by which the ID information is stored in the camera main body side can be known by the third party by any possibility, because, in the already installed memory means, the program itself does not exist, it can not be conducted. The unfair removing off or exchange of the memory means, and reading-out or erasing of the image data by the user or the third party are prevented.

Further, in order to solve the above problems, the present invention is characterized in that: before the photographing, the ID information of the memory means and the ID information stored in the main body side are compared and collated with each other, and only when the ID information is coincident to each other, the photographing is made possible.

According to this structure, every time when the power source switch is turned on, because the ID information of the memory means and the camera main body are collated with each other, the unfair removing off or exchange of the memory means, and reading-out or erasing of the image data by the user or the third party are prevented Further, in order to solve the above problems, the present invention is structured in that: the image information obtained when the photographic field is photographed, is ciphered and stored in the memory means.

According to this structure, even when the third party or user can unfairly read out the photographic data from the memory means by any possibility, because the image data itself is ciphered, the original image information cannot be reproduced. The unfair removing off or exchange of the memory means, and reading-out or erasing of the image data by the user or the third party are prevented.

Further, in order to solve the above problems, the present invention is characterized in that: the digital camera main body is packed with the protective film.

According to this structure, when the memory means is tried to be removed off, because it is necessary to strip off the external packing protective film, it can be easily confirmed by the appearance. The unfair removing off or exchange of the memory means, and reading-out or erasing of the image data by the user or the third party are prevented.

BRIEF DESCRIPTION OF THE DRAWINGS

FIG. 9 is an outline view showing a recycle system realized by using the digital camera of the present invention.

DETAILED DESCRIPTION OF THE PREFERRED EMBODIMENTS

Figure 1:
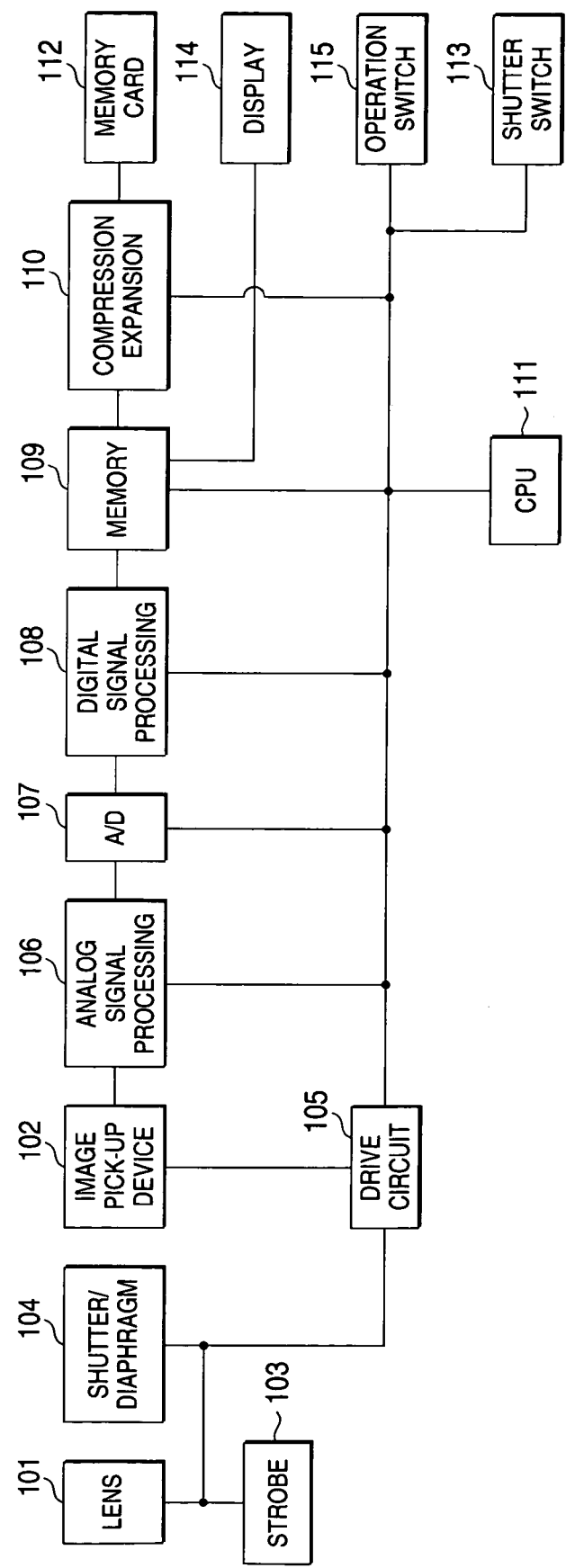
FIG. 1 is a block diagram showing the internal structure for the digital camera in an embodiment of the present invention.

Referring to the drawings, the embodiments of the present invention will be described below. FIG. 1 is a block diagram showing the structure of a digital camera of one embodiment of the present invention. A digital camera 100 is provided with: a photographing lens 101 using the injection molded plastic lens; image pick-up device 102 such as the CCD second dimensional image sensor to output an image signal; strobe 103 to irradiate an auxiliary light onto a subject; shutter•diaphragm mechanism 104; drive circuit 105 to output a drive signal to the photographing device 102; analog signal processing circuit 106 as a signal processing section; A/D conversion section 107 by which the image signal is converted from the analog signal to the digital signal; digital signal processing circuit 108; memory 109 in which the image signal is temporarily stored as the image data; image data processing section 110 to compress•expand the image data; CPU 111 to control the whole of the digital camera 100; and memory card 112 as a detachable memory means to record the proper ID information or photographed image, and the other data, and further, it is structured by a shutter switch 113, display 114, and operation switch 115.

When the power source switch is turned on, the necessary power source is supplied to each of above blocks. Then, at the time of the low illuminance, the strobe 103 is used as the auxiliary light, and when the shutter switch 113 is pressed, the reflected light reflected on the subject is incident onto the photographing lens 101 and shutter•diaphragm mechanism 104, and focused on the image pick-up device 102. Herein, the shutter 104 is a mechanical shutter, and when the signal is read from the image pick-up device 102, it is prevented that, when the light is in the shutter, the smear is generated. Further, the diaphragm 104 is structured by the electronic shutter of the image pick-up device 102 and the mechanical shutter, and controls the exposure amount to the image pick-up device 102. The strobe can be compulsively emitted also besides the necessary time. In this connection, in the present embodiment, the strobe is used, but another auxiliary light may also be used.

Then, the image pick-up device 102 is driven by the image pick-up device driver (not shown in the drawing) at the timing generated in the timing generation circuit (not shown in the drawing), and the image signal which is the image data is outputted. In this connection, this image pick-up device driver becomes unnecessary depending on the drive voltage condition of the image pick-up device 102.

The image signal is, after it is signal processed in the analog signal processing section 106, converted into the digital signal in the A/D conversion section 107, and signal processed again in the digital signal processing section 108, and temporarily stored in the memory 109. Herein, when it is displayed on the display 114 for the image monitor, the content of this memory is read out, and sent to the monitor and can be displayed. Further, the image data after the photographing, is compressed in the image data processing section 110 and recorded in the memory card 112. Depending on the photographing mode, it is also possible that the process of compression is omitted, and the image data is recorded. The whole of the camera is controlled by the CPU 111, and there is also the menu switch by which the user conducts each kind of setting, or release switch (not shown). In the present embodiment, the CPU 111 or image data processing section 110 ciphers the image data, however, the exclusive IC may be separately mounted. Relating to the ciphering processing, it will be detailed later.

Figure 2:
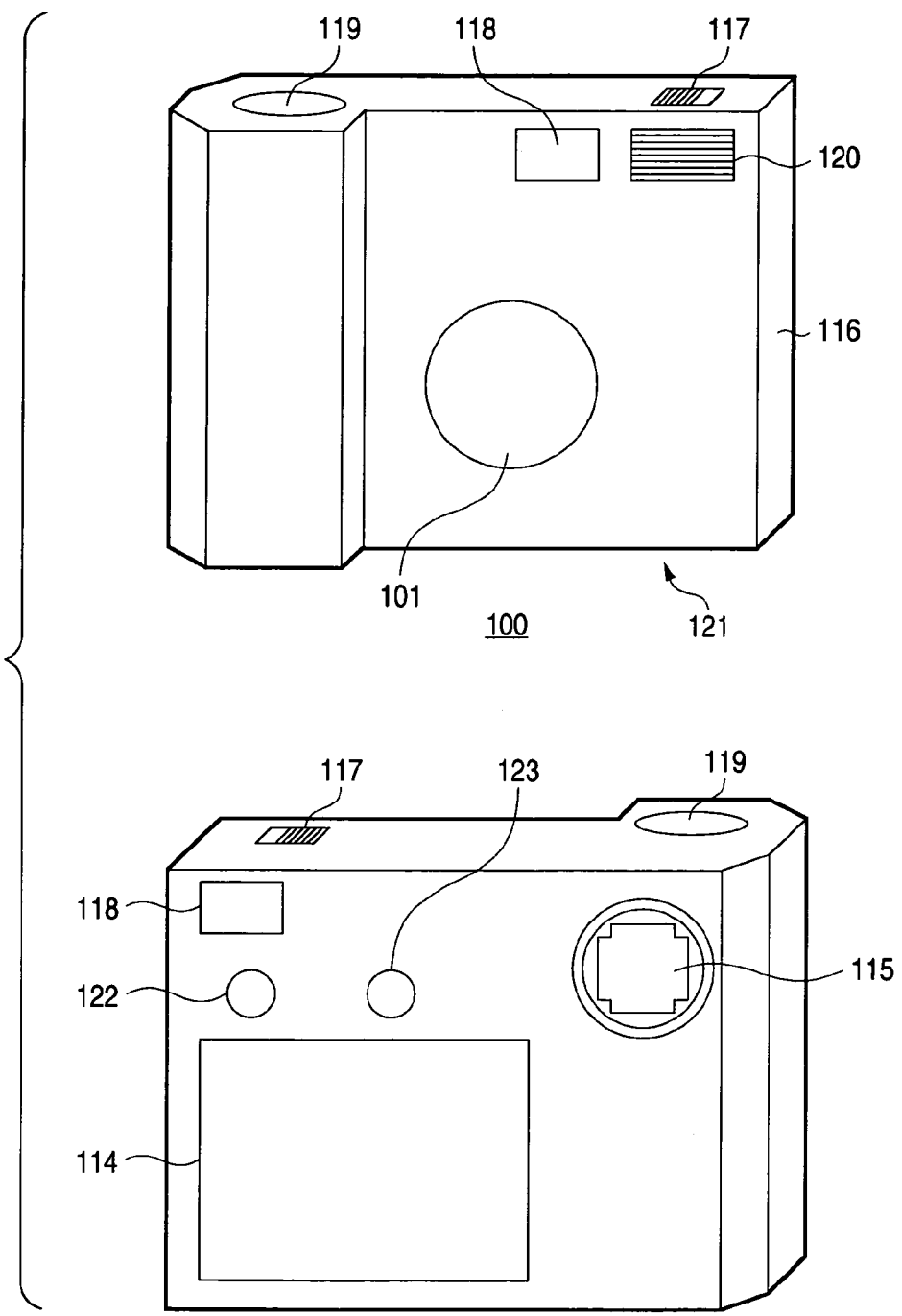
FIG. 2 is an appearance outline view of the digital camera in an embodiment of the present invention, and shows a condition before the camera main body is packed with a protective film.
Figure 3:
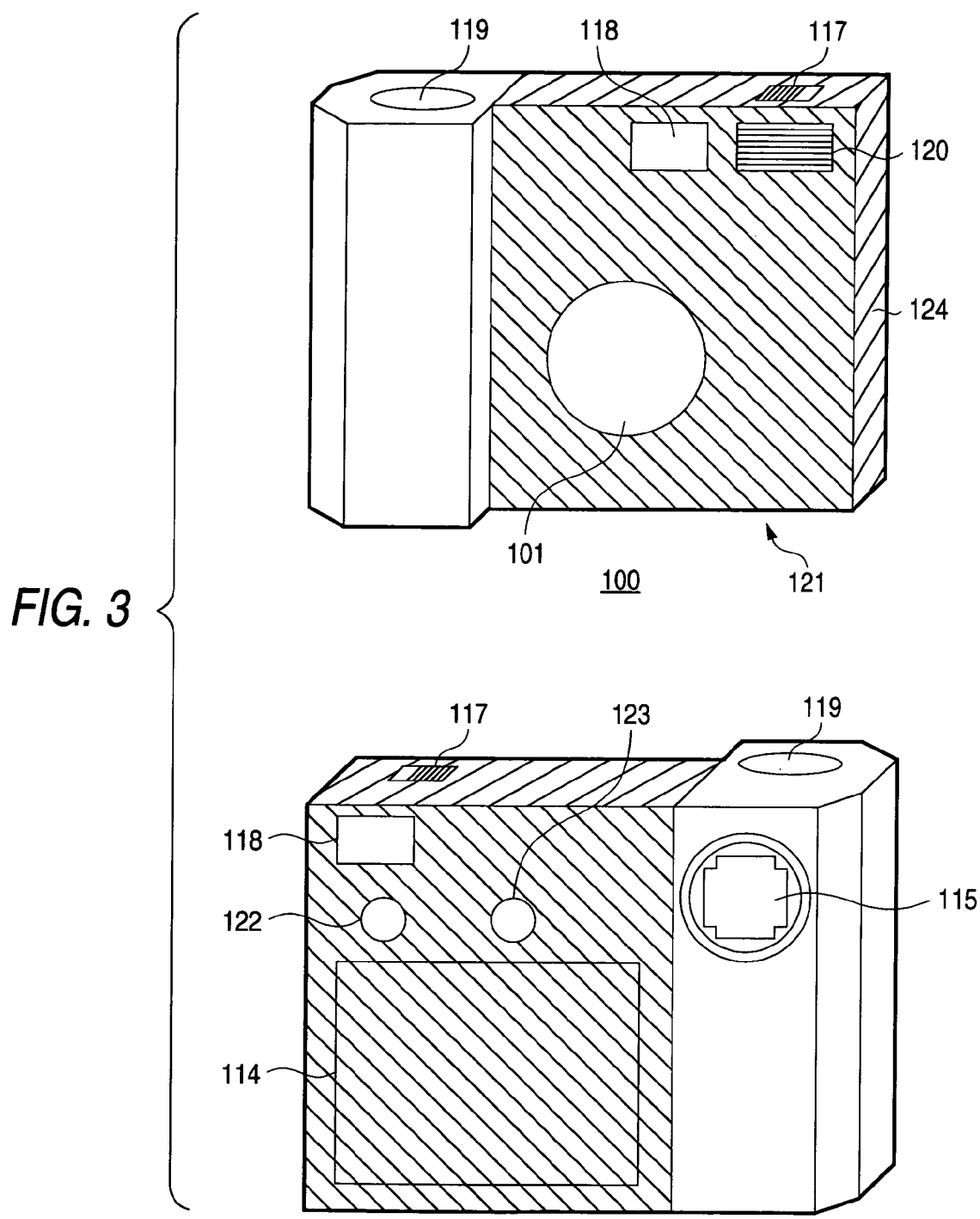
FIG. 3 is an appearance outline view of the digital camera in one embodiment of the present invention, and shows a condition after the camera main body is packed with the protective film.

Next, an outline appearance view of the digital camera in the present embodiment is shown in FIG. 2 and FIG. 3. FIG. 2 shows a condition before the camera main body is packed with a protective film, and FIG. 3 shows a condition after the camera main body is packed with the protective film. The digital camera 100 is structured by: a casing 116; power source switch 117; optical viewfinder 118; photographing lens 101; shutter button 119; auxiliary light light-emitting section 120; memory card insertion section 121 (in the view, it is on the bottom surface of the camera main body); display 114; operation switch 115; menu switch 122; and execution/image plane change over switch 123.

The protective film 124 shown in FIG. 3 is a film which is packed in order to protect the memory card insertion section 121 and display 114, or in order to structurally reinforce the main body. In the camera recovered form the user after the photographing completion, the protective film is stripped off and the memory card 112 is taken out. On the one hand, in the re-production process, the camera is packed again with the protective film 124 and the re-production product is completed.

Herein, the slide switch (power source switch 117) which is necessary to be exposed to the outside, auxiliary light light-emitting section 120, optical viewfinder 118, and photographing lens 101 may, when the film has the high transparency and no printing, be covered with the transparent portion without opening the window. The push switch such as the menu switch 122 or execution/image plane change over switch 123, when only the position of the switch is known, because it is no problem even when the switch is covered by the film, the display may be made so that the position can be known or the portion may be made a transparent window and covered. However, when the switch is protruded, it is necessary that the film is expanded so that the tension does not affect the film. The surface of the display 114 is covered with the transparent material such as the hard glass or acrylic resin, but because there is a possibility that it is flawed even when it is so, it is preferable that this portion is also covered by the film with the high transparency. A cross switch displayed as the operation switch 115 is not covered with the film in the present embodiment, but, it is no problem when the switch is arranged in a portion covered with the film. This is the same also for the shutter button 119.

Next, the storing operation of the ID information in the digital camera of the present embodiment will be described. This storing operation is an operation in which the manufacturer registers the ID information of the memory card into the camera body when the digital camera is produced, or the recovered camera is re-produced, thereby, the unfair use of the medium other than the installed memory card can be prevented. This operation is conducted after the assembly of a wide use camera is completed.

In this connection, because this storing operation is not conducted by the user or the third party, it is set so that the program is started by the special switch operation. The special operation is necessary so that, when the digital camera is used, the user does not easily enter into this operation mode. For example, in the present embodiment, while the menu switch 122, execution/image plane change over switch 123, and shutter button 119 are simultaneously pressed, when the power source switch 117 is turned on, the camera is set in such a manner that the camera enters into this mode.

Figure 4:
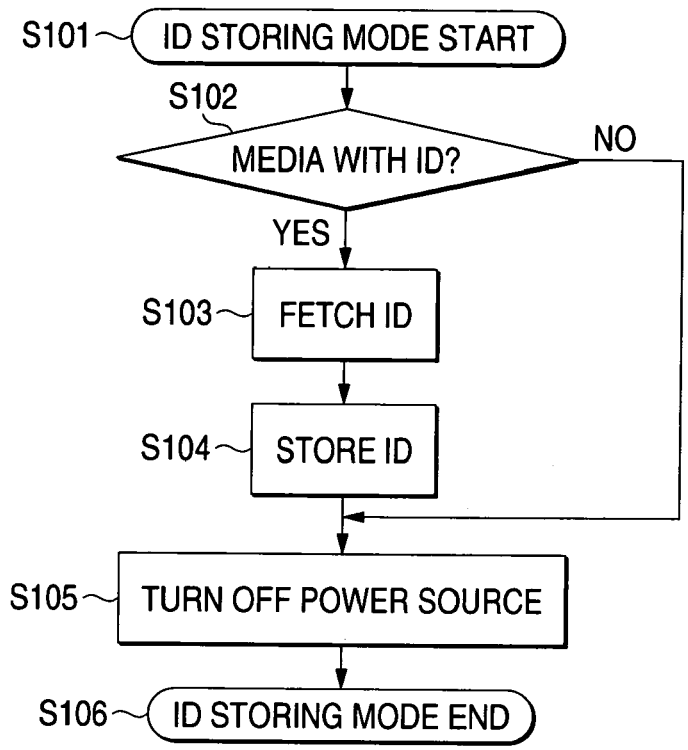
FIG. 4 is a flow chart showing a sequence of an ID storing operation in the first embodiment of the present invention.

FIG. 4 is a flow chart showing the sequence of this operation. These sequences are stored in the CPU 111 or memory 109 in the form of the program.

When the power source switch is turned on by the special operation as described above, the program is started and the ID storing mode is started (step S101). Initially, it is confirmed whether the memory card with the ID is installed in the memory media installation section (step S102). At the time of production, because the appropriate memory media is installed, in the next step S103, the taking-in of the ID information is started. In all of the memory card installed at the time of the production, the ID information which is respectively different is previously stored.

After the ID information taken-in from the memory card is stored in the main body memory 109 (step S104), the power source of the camera main body is automatically turned off (step S105), and the ID storing mode is completed (step S106). In step S102, when the memory card is not installed, or when the irregular memory media in which the ID information is not stored, is installed, the storing operation of the ID information is not conducted, and the power source of the camera is automatically turned off. As the flow of the product, after the above operations are conducted, the camera is supplied to the user through the retailer.

At the time of the re-production of the recovered camera, the ID information stored in the recycled camera main body and the ID information of the newly installed memory card are different with each other. However, by conducting this storing operation, the ID information of the memory card which is newly installed is stored by overwritten on the camera main body side, and the old ID information of the camera main body is erased. Therefore, when the re-production is completed, it can be the condition that the ID information of the memory card and the ID information of the camera main body coincide again. In the re-production process, after the above storing operation is conducted, the re-produced camera is supplied again to the user through the retailer.

Figure 5:
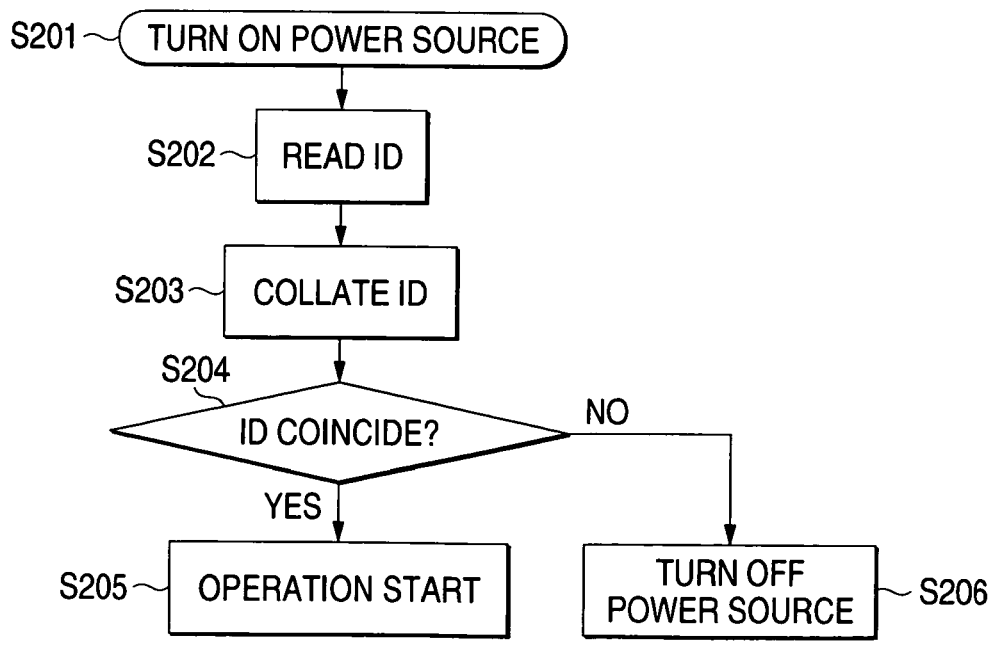
FIG. 5 is a flow chart showing an initial operation sequence in one embodiment of the present invention.

Next, the initial operation sequence when the user starts the use of the digital camera will be described. FIG. 5 is a flow chart showing this initial operation sequence. These sequences are stored in the CPU 111 or memory 109 in the form of the program.

When the user turns on the power source switch 117 of the digital camera 100 (step S201), the ID information stored in the installed memory card is read into the main body memory 109 (step S202), and it is collated with the ID information stored in the main body at the time of the production or re-production (step S203). In the step S204, the judgment is conducted, and when these are coincident to each other, the camera becomes the photographic possible condition (step S205) as it is. On the one hand, when these ID information are not coincident to each other, it is judged that the memory card is unfairly taken out and exchanged, the power source is turned off (step S206), the camera can not be used. Normally, because the recording media insertion section 121 is covered with the protective film 124, the user does not take out the memory card. Even when the memory card is taken out for any reason, in the case where it is the initially installed card, when it is returned to the original condition, because the ID information are coincident to each other when the switch is turned on, it becomes a condition that the camera can be used. Because this sequence makes only the card having the different ID information or absolutely separated manufacturers card not usable, the unfair data read-out or print, or the unfair recycle of the camera by the third party can be prevented.

Next, the encipherment method of the digital image data obtained by the photographing will be described. Even when the ID storing operation as described above, and the ID collation when the power source is turned on are conducted, when the third party can know the above special switch operation by chance, and while the digital camera main body and the memory media installed at the time of the production or re-production are controlled in 1 to 1, when the read-out of the image data and print, and erasing of the image data are reproducibly conducted, to conduct the unfair recycle system becomes theoretically possible. Accordingly, it is preferable that the photographed image data is ciphered and stored. For the encipherment, any of a secret key ciphering system, or open key ciphering system may be used.

Figure 6:
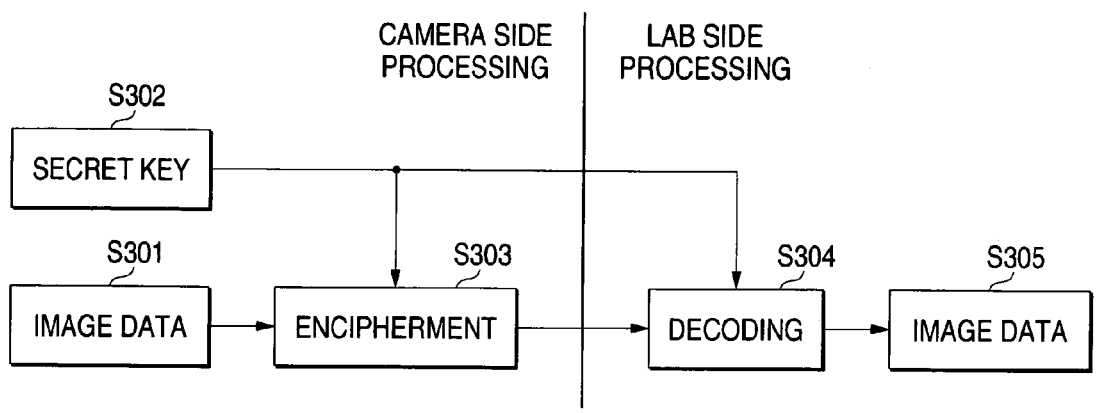
FIG. 6 is a flow chart showing a flow of an encipherment by a secret key.

FIG. 6 is a flowchart showing the flow of the encipherment by the secret key. In the image data processing section 110 of the digital camera, at the time of the camera production, the secret key which is different for each camera is stored so that the reading out from the external can not be conducted. This secret key is necessary in the data reading-out and print process when the camera is recovered, the manufacturer stores the data in which the ID information of the camera main body (the same as the ID information of the memory card) and the secret key are correspondent to each other, as the data base in the host computer.

When the digital image is generated by the photographing (step S301), by using the secret key previously stored in the camera main body (step S302), the encipherment is conducted (step 303). After the photographing is completed, when the camera is recovered, the ID information of the memory card is read out at the lab side, and the secret key corresponding to the ID information is read from the host computer. By using this secret key, the decoding is conducted (step S304), and the original image data is obtained (step S305). As the secret key ciphering system, a predetermined ciphering system such as DES (Data Encryption Standard) or triple DES may be used.

Figure 7:
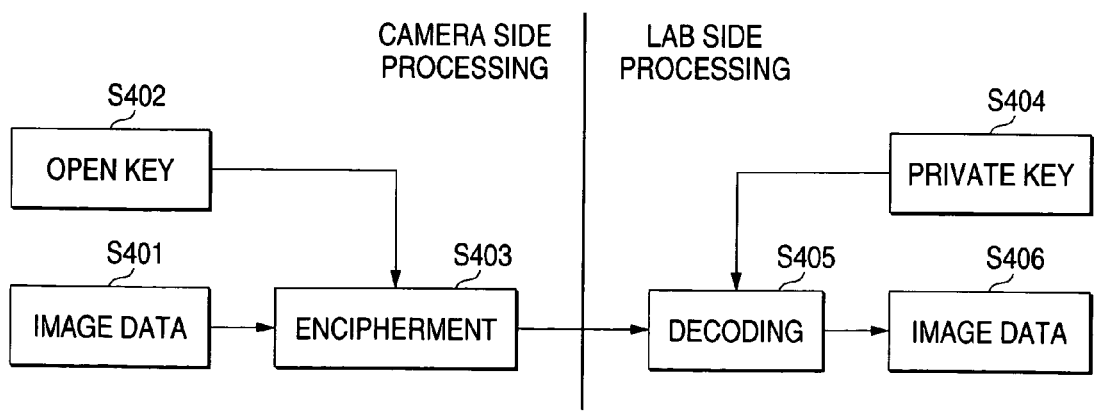
FIG. 7 is a flow chart showing a flow of an encipherment by an open key.

FIG. 7 is an outline view showing a condition of the encipherment by the open key. In the memory 109 of the digital camera, at the time of production, the open key is stored. The private key which is a pair of this open key is, when the camera is recovered, necessary in the data reading out and the print process, the manufacturer stores the data in which the open key is made to correspond to the private key, as the data base in the host computer.

When the digital data is generated by the photographing (step S401), by using the open key previously stored in the camera main body (step S402), the encipherment is conducted (step S403). This open key is also recorded in the memory card. After the photographing is completed, when the camera is recovered, the open key of the memory card is read out at the lab side, and the private key correspond to the open key is read from the host computer. By using this private key (step S404), the decoding is conducted (step S405), and the original image data is obtained (step S406). In this connection, the open key is not stored in the camera main body at the time of production, and stored directly in the memory card, and at the time of the encipherment, it may also be read out on the main body side. As the open key ciphering system, a predetermined ciphering system such as an RSA may be used.

In the ciphering system by the secret key, although the processing speed is high, it is necessary that the key is controlled for each digital camera. On the one hand, in the system according to the open key, a plurality of digital cameras having the same key can be produced. Therefore, the key control is simplified, but because the calculation amount is large, the burden of the camera side is large, and there is a disadvantage that the processing speed becomes low. Accordingly, corresponding to the cost of the camera or the structure of the production, recycle line, the ciphering system may be selected.

Next, the second embodiment of the present invention will be described. In the present embodiment, a program to carrying out the storing operation of the ID information is stored in the memory card, and the program is made to be automatically erased after the ID storing operation.

Figure 8:
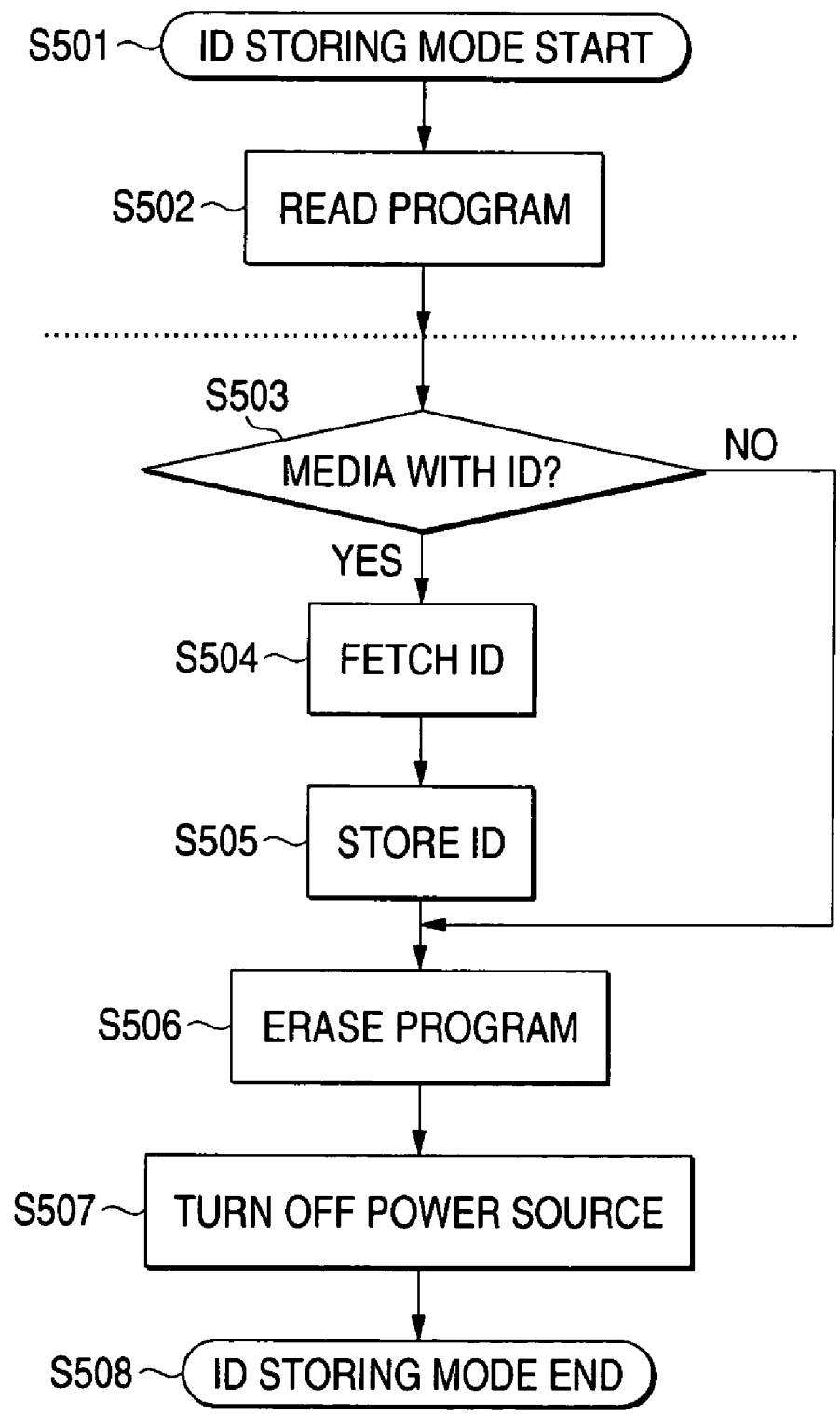
FIG. 8 is a flow chart showing a sequence of an ID storing operation in the second embodiment of the present invention.

FIG. 8 is a flowchart showing the sequence of the ID storing operation of the present embodiment. In these sequences, the processing until the program stored in the memory card is read in the camera main body (the upper side of the dashed line in the drawing) is stored in the CPU 111 or memory 109 in the form of the program. The program to carry out the subsequent ID storing (the lower side of the dashed line in the drawing) is stored in the memory card.

As described also in the first embodiment, this storing operation registers the ID information of the memory card into the camera main body at the time of the digital camera production or re-production, thereby, the unfair use of the medium other than the memory card can be prevented. This operation is conducted after the assembly of the wide use camera is completed, or the re-production of the recovered camera is completed. Because this storing operation is conducted by the user, it is set that, by the special switch operation, the program is started, and in the present embodiment, while the menu switch 122, execution/image plane change over switch 123, and shutter button 119 are simultaneously pressed, when the power source switch 117 is turned on, the camera is set so that it enters into this mode.

By the above special switch operation, when the power source switch is turned on, the ID storing mode is started by the program of the camera main body side (step S501), and the program in the memory card is read in the main body memory 109 (step S502). The read-in program is automatically carried out. Initially, it is confirmed whether the memory card with the ID is installed into the memory media installation section (step S503). Because, at the time of the production, the appropriate memory media is installed, in the next step S504, the taking-in of the ID information is started. The taken-in ID information is stored in the memory 109 (step S505). After that, the program itself is erased by this program (step S506), the power source of the camera main body is turned off (step S507), and the ID memory mode is completed (step S508). In step S503, when the memory card is not installed, or when the irregular memory media in which the ID information is not stored, is installed, the storing operation of the ID information is not conducted, and automatically, the power source of the camera is turned off. The digital camera in which the registration operation of the ID information is completed, is supplied to the user through the retailer.

In a stage in which the camera is circulated in the market, even when the third party unfairly replaces the memory media, it is checked in the ID information collation between the camera main body and the memory media which is conducted at the time of the power source switch turning on and the photographing can not be conducted. Further, even when the third party can know the above special switch operation by chance, the ID information can not absolutely be stored in the main body side. It is for the reason that the program to store the ID information is in the memory card side, and the program of the memory card by which ID storing operation is once conducted is erased.

In the first embodiment, because the program for conducting the storing operation of the ID information is stored in the camera main body side, in the case where the third party can know the above special operation by chance, when the memory card is one produced for the camera, even when it is not the card installed at the purchase, there is a possibility that the storing of the ID information into the main body side is freely conducted. When the image data is ciphered, because it is prevented that the third party unfairly conducts the reading of the data or print, there is no practical problem, but, according to the second embodiment, the security in the storing operation of the ID information can be more increased. Further, because it is structured in such a manner that the program stored in the memory card side is read into the camera main body side, not only the storing of the ID information, but the other functions of the camera or operations can also be easily changed and improved. However, in this case, it may be preferable that the program of the memory card is not erased.

Because the internal structure, appearance, other functions or operations in the second embodiment are the same as the first embodiment, the explanation will be omitted.

Finally, referring to FIG. 9, the outline of the recycle system which can be realized by using the digital camera of the present invention will be described bellow.

In the camera production process 202 of the production system (manufacturer) 201 to produce the camera, the camera main body and memory card are produced. In the camera main body, the ID storing operation execution program, secret key or open key are stored. In the memory card, the ID information is stored, and depending on the case, the ID storing operation execution program may be stored. Further, the open key may be stored. After that, in the camera main body, the memory card is installed, and the ID storing operation is carried out. The ID information stored in the camera main body and the ID information stored in the memory card are in the condition of coincidence, and finally, the camera is packed with the protective film and the product is completed, and supplied to the user through the retailer 205. The ID information of the memory card and the information of the corresponding data to the secret key or open key are stored in the host computer 204 in the production system 201.

The camera in which the photographing is completed by the user is recovered, and sent to the re-production system (lab) 206. In the re-production system 206, the memory card is removed from the recovered camera, and the main body is sent to the camera re-production process 203 of the production system 201 at once, and recycle processed. The ID information stored in the removed memory card is read out in the re-production apparatus 207, and based on that, the key for decoding stored in the host computer 204 of the production system 201 is read out. The photographing data decoded by using the key is service-presented to use in the form of the print or image data (208). Then, also the memory card is sent to the camera re-production process 203 of the production system 201 and recycle processed.

In the camera re-production process 203, the reproduction of the camera main body and memory card are separately conducted. For the camera main body, the inspection, exchange of the parts, and renewal of the secret key are conducted. For the memory card, the clear of the photographing information, and inspection, exchange are conducted. The renewal of the ID information or open key may be conducted. When the ID storing operation program is made to be held in the memory card side, after the data is cleared, the writing of the program is conducted. In the re-produced camera main body, the reproduced memory card is installed, and the ID storing operation is conducted. In the camera main body, because the ID information of the newly installed memory card is overwritten and recorded, the ID information is in the condition of the coincidence again, and finally, the camera main body is packed with the protective film and the reproduction product is completed. The re-production product is supplied again to the user through the retailer 205. This cycle is repeated and the recycle system is structured.

According to the digital camera of the present invention, because the photographing data is stored in the memory card, the data reading out after the digital camera is recovered, and the print process (memory card) and the recycle process (camera main body) can be separated. Conventionally, in the conventional method by which the photographing data is read from the camera main body, because a large amount of digital cameras are accumulated in the data reading out and print process, in order to process this without delay, it is necessary that the large storage space is secured, or a long automatic process line is installed. Such a cost prevents the recycle system in which the digital camera is stably supplied in the low cost and recovered and re-used, however, according to the present invention, in the data reading-out and print process, because there may be only the small sized memory card, the digital camera whose volume is large is not accumulated in this process, and the processing line can also be designed compactly. Further, because the recycle process which is, conventionally, continuously conducted after the data reading out and print process, can be separately conducted parallely, the effective operation can be conducted. In that case, because it is not necessary that the camera main body and the memory card are controlled in 1 to 1, each operation is simplified. Further, although the quality assurance of the image data which is the most important for the recycle system, and the process to prevent the unfair data reading out and print service, and the re-use of the digital camera are simple, the high security can be realized. Because, in the manufacturer, after the camera main body is assembled, by the mechanical operation, the storing operation of the ID information can be conducted, there is also the effect that the working line for that can be easily structured.

What is claimed is:

1. A digital camera comprising:
    an image pick-up means for outputting an image signal corresponding to a photographic field,
    processing means for processing the image signal,
    detachable memory means for storing so that the image information processed by the processing means can be read out,
    control means for controlling an operation of each section, and
    a program for reading out an ID information stored on the detachable memory and storing the ID information in a digital camera main body side,
    wherein the ID information is defined as proper identifying information stored in the memory means previously, and
    wherein the program itself is erased after the ID information is stored in the digital camera main body side.

2. A digital camera according to claim 1,
    wherein the program is accommodated in the memory means.

3. A digital camera according to claim 2,
    wherein, before the start of photographing, the ID information of the memory means is compared with the ID information stored in the main body side, and only when the ID information coincides with each other, the photographing can be conducted.

4. A digital camera according to claim 2,
    wherein the image information obtained by photographing the photographic field is ciphered and stored in the memory means.

5. A digital camera according to claim 2,
    wherein the digital camera is packed with a protective film.

6. A digital camera according to claim 1,
    wherein, before the start of photographing, the ID information of the memory means is compared with the ID information stored in the main body side, and only when the ID information coincides with each other, the photographing can be conducted.

7. A digital camera according to claim 1,
    wherein the image information obtained by photographing the photographic field is ciphered and stored in the memory means.

8. A digital camera according to claim 7, wherein the image information obtained by photographing the photographic field is ciphered by the processing means, and
    wherein the processing means uses a secret key to cipher the image information.

9. A digital camera according to claim 8, wherein the secret key is stored previously by a manufacturer of the digital camera in the digital camera main body side.

10. A digital camera according to claim 9, wherein the secret key corresponds to the ID information stored in the memory means.

11. A digital camera according to claim 10, wherein the image information is decoded when the ID information is read from the memory means, and when the secret key is read by a computer and the secret key corresponds to the ID information.

12. A digital camera according to claim 11, wherein the secret key corresponds to a triple Data Encryption Standard (DES).

13. A digital camera according to claim 7, wherein the image information obtained by photographing the photographic field is ciphered by the processing means, and
    wherein the processing means uses an open key to cipher the image information.

14. A digital camera according to claim 13, wherein the open key is stored in the digital camera main body side by a manufacturer when the digital camera is produced.

15. A digital camera according to claim 14, wherein the open key corresponds to a private key, and the private key is stored in a computer.

16. A digital camera according to claim 15, wherein the open key is recorded in the memory means, and
    wherein the image information is decoded when the private key is read from the computer and the private key corresponds to the open key which is read from the memory means.

17. A digital camera according to claim 15, wherein the open key and the private key correspond to a RSA ciphering system.

18. A digital camera according to claim 1,
    wherein the digital camera is packed with a protective film.

19. A digital camera according to claim 1, wherein the program is executed when a plurality of switches are actuated simultaneously.

20. A digital camera according to claim 19, wherein the plurality of switches comprise a menu switch, an image plane change over switch and a shutter switch.

21. A digital camera according to claim 1, wherein the ID information is defined as proper identifying information stored in the memory means by a manufacturer of the digital camera when the digital camera is recycled.

22. A digital camera according to claim 1, wherein the digital camera further comprises a memory card insertion means and
wherein the digital camera is packed with a protective film, the protective film covers the memory card insertion means.

23. A digital camera according to claim 1, wherein the digital camera is packed with a protective film and the protective film covers a bottom surface of the detachable memory means.

24. A digital camera according to claim 1, wherein the digital camera further comprises another memory means in the digital camera main body side, and
wherein the program reads out ID information from the detachable memory means and the program stores the read out ID information in the another memory means.

25. A digital camera comprising:
an image pick-up means for outputting an image signal corresponding to a photographic field,
processing means for processing the image signal,
detachable memory means for storing so that the image information processed by the processing means can be read out,
control means for controlling an operation of each section, and
a program for reading out an ID information and storing the ID information in a digital camera main body side,
wherein the ID information is defined as proper identifying information stored in the memory means previously,
wherein the program itself is erased after the ID information is stored in the digital camera main body side, and
wherein the digital camera is automatically turned off after the program is erased.

* * * * *